Dec. 29, 1959   R. HAGEN ET AL   2,918,698
MANUFACTURE OF HOLLOW ARTICLES FROM PLASTICS
Filed June 7, 1955
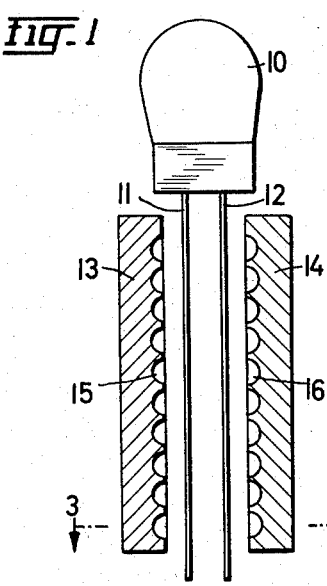
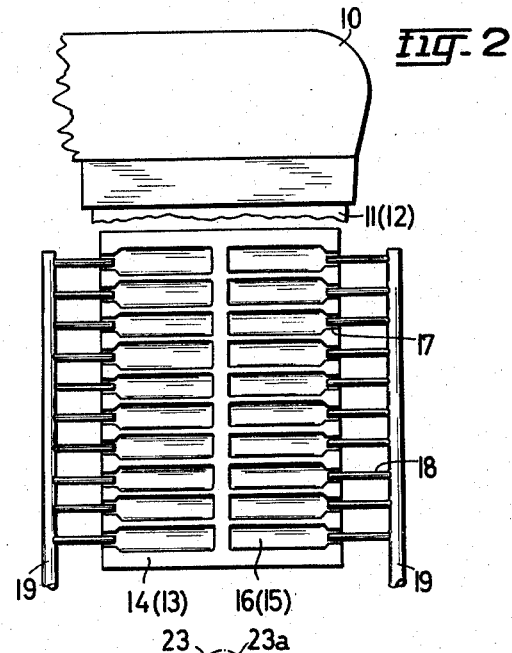
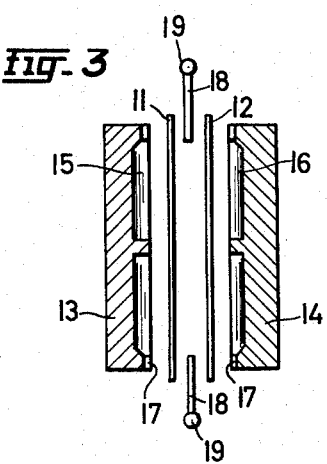
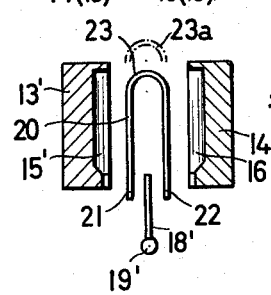
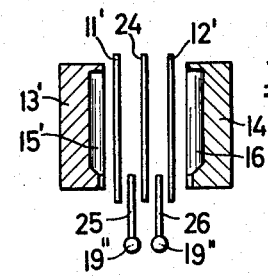
INVENTORS
Reinold Hagen, Norbert Hagen
BY

United States Patent Office 2,918,698
Patented Dec. 29, 1959

2,918,698

MANUFACTURE OF HOLLOW ARTICLES FROM PLASTICS

Reinold Hagen and Norbert Hagen, Siegburg, Rhineland, Germany

Application June 7, 1955, Serial No. 513,852

Claims priority, application Germany June 14, 1954

9 Claims. (Cl. 18—5)

This invention relates to a method and an apparatus for forming hollow articles, especially bottles and the like, from plastic materials. In the manufacture of hollow articles, up to now tubes were used as the starting material. From the tubes, the final shapes were obtained in sectional molds. A blow pipe was used to project into a pinched off segment of the tube within the mold and to admit a gaseous pressure medium, such as compressed air.

The primary objects of our invention which also makes use of sectional molds and blow pipes is to cheapen and speed up the manufacture of hollow plastic articles, particularly bottles and other containers having a neck.

This object and such other objects as will appear from the following description are achieved, according to the present invention, by extruding at least two sheets of the plastic material used to suspend vertically into the space between the open sections of a sectional mold. The mold sections are provided with cutting edges to pinch off, as the mold closes, segments of the strips within the mold. At the same time, the pinched off segments are sealed to one another at the severed edges. Upon admission of a gaseous pressure medium to the embryo hollow bodies thus formed, these bodies expand against the walls of the cavities within the mold to assume the desired final shape.

The specification is accompanied by a drawing in which:

Fig. 1 is a section in elevation through a sectional mold embodying features of our present invention;

Fig. 2 is an elevational view of one of the sections of the mold of Fig. 1, looking toward the parting surface;

Fig. 3 is a horizontal section taken in the plane of the line 3—3 of Fig. 1;

Fig. 4 is a horizontal section through a modified mold, using a different intermediate product; and Fig. 5 is a horizontal section through a further modification of a mold according to the invention.

Referring to the drawing in greater detail, and initially to Figs. 1 to 3, extrusion nozzles of a press 10 open downwardly and extrude simultaneously two sheets 11 and 12 of a thermoplastic material. The two sheets 11 and 12 are substantially parallel to one another and are introduced into the space between the two open halves 13 and 14 of a sectional mold. These two mold halves are shown open or separated in Figs. 1 and 3. In the form selected for illustration, each of the halves 13 and 14 defines twenty half cavities 15 and 16. There are ten such cavities one above the other, and two rows of ten cavities, beside one another, whereby, as can be clearly seen from Fig. 2, the neck parts 17 of the half cavities are directed in opposite directions. One of the bottle-shaped half cavities of each row is aligned with one of the half cavities of the other row, and the bottom parts of each aligned pair of cavities are adjacent. As can also be seen from Fig. 2, all of the cavities 15, 16 are arranged horizontally. The narrow neck parts 17 which form the necks of the bottles to be produced are turned, as has been mentioned, to one of two sides and open toward the same side. The blow pipes 18 enter these openings and are all parallel to one another. The pipes 18 of each row are connected to a common main line 19.

When the two halves 13 and 14 of the mold are closed, the two sheets 11, 12 are pressed against one another by and along cutting edges which surround the cavities 15, 16. The segments or blanks punched out in this way are sealed to one another along the severed edges. At the same time, portions of the segments are pressed against the blow pipes 18. From Fig. 3 it will readily be seen that the blow pipes 18 extend between the sheets. Each of the blow pipes projects into an embryo hollow body which is enclosed by a complete cavity 15, 16. As soon as compressed air is injected through the inflating blow pipes, the hollow bodies in all the cavities expand until they conform to the walls of the cavities, where they cool off. When the blow pipes 18 are then withdrawn, and the halves 13, 14 of the mold separate, twenty bottles can be discharged from the mold at the same time. The individual bottles may still be united by thin flashes which, however, can readily be broken off.

In accordance with Fig. 4 of the drawing, a structure 20 of U-shaped cross section, which structure is constituted by two sheets, is used as a step product. The legs 21, 22 of the U are substantially parallel to one another and are connected by a curved web 23. The U lies flat, and the free ends of the legs of the U point sideways. The structure 20 is further handled in the same way as has been described in connection with Figs. 1 to 3, or similarly. If the structure is shaped so that the web portion 23 lies outside the sectional mold 13′, 14′, as indicated by dotted lines at 23a, there is no difference whatsoever in the further work. If, however, the web portion 23 comes to lie within the mold, as indicated by full lines, the material of the web portion is not pinched off when the mold is closed. The curved web remains intact within the mold cavities, and only the legs 21 and 22 of the U-shaped structure are sealed to one another by being pinched off and press-molded against the blow pipes 18′. Upon injection of compressed air through the blow pipes, the hollow embryo bodies within the individual cavities 15′, 16′ expand as has been described hereinbefore in connection with Figs. 1–3 until they conform to the walls of the cavities.

It will be apparent that molds shown in Figs. 1 to 3, having two opposing rows of cavities, may also be used for a U-shaped structure, and on the other hand two independent sheets as shown in Figs. 1 to 3 may be used in molds as that of Fig. 4, which do not have two cavities side by side, or two rows of such cavities.

In the apparatus of Fig. 5, three sheets 11′, 24, and 12′ are extruded parallel to each other. Two inflating blow pipes 25, 26 or two rows of such blow pipes are required to extend into the cavity sections at either side of the center strip 24. When the mold 13′, 14′ is closed, the three sheets are joined and embryo double-compartment hollow bodies are formed. It is obvious that a plurality of such bottles or ampullae may simultaneously be formed, either with one being on top of the other, or one on top of the other and additionally two side by side.

It is believed that the method of our invention, as well as the construction and operation of the forms of apparatus, as shown, and the many advantages thereof, will be understood from the foregoing detailed description. Some of the features of the invention are reviewed hereinafter.

The synthetic material is not extruded as a tube, but in two roughly parallel sheets which are introduced between the separated halves of a sectional mold. The sheets are sealed to one another by cutting edges of the closing mold sections along the cut edges. The embryo containers thus formed are then expanded by injection of compressed air or any other gaseous pressure medium until the body conforms to the walls of the respective mold cavity. The referred to two sheets may also form the two legs of a structure of approximately U-shaped cross section. The web of the U-structure may be made to lie outside or within the mold cavity when the mold closes. In the latter case, it is not cut off. Portions of the sheets may be press-molded against the outer surface of blow pipes to form the neck portions of the articles to be produced.

The mold which is vertically sectioned in a known manner is provided, according to the invention, with lateral openings for the formation of the necks of the articles. An inflating blow pipe projects from the side into each lateral opening. This new arrangement permits, as has been shown, the provision of any desired number of cavities one above the other, and of horizontally extending blow pipes, one of which extends into each cavity.

Our invention offers great advantages in the manufacture of small and very small hollow articles, such as ampullae.

It is also possible to arrange two cavities side by side and to have inflating blow pipes project into them from opposing sides. Working from two sides has the advantage, particularly in the case of small articles, that much larger number of pieces may be produced simultaneously. During the same cooling period, a multitude of articles is cooled so that the outlet can be largely increased.

Further, it is possible to introduce three sheets into the mold simultaneously and thus to produce double-compartment containers.

It will be apparent that while we have shown and described our invention in a few forms only, many changes and modifications may be made without departing from the spirit of the invention defined in the following claims.

We claim:

1. Process for the simultaneous manufacture from plastics of at least two hollow articles, especially bottles and other containers having a neck, comprising spacedly extruding at least two sheets of the plastic material to suspend vertically, in a condition of plasticity, and in a substantially parallel relationship, into the space between the open sections of a sectional mold, having as many blow pipes as hollow articles are produced enter sideways and between the extruded sheets into the open mold space, thus having the blow pipes extend angularly with respect to the extrusion direction, closing the mold, pinching off segments of the sheets by means of the mold sections, thereby sealing pinched-off segments at adjacent severed edges to one another, and press-molding portions of the sheets between the blow pipes and the mold sections to form the neck parts, admitting a gaseous pressure medium through the blow pipes, expanding the embryo hollow bodies thus obtained, opening the mold, withdrawing the blow pipes, and removing the blown articles from the mold.

2. Apparatus for the simultaneous manufacture from plastics of at least two bottles and other hollow articles having a neck formation, comprising a sectional mold including two opposing sections, the mold having, when closed, at least two separated cavities one above the other and conforming in shape to the articles to be formed, the cavities extending horizontally and having the neck parts directed outwardly, nozzle means to spacedly extrude two sheets of the plastic material use to suspend vertically into the space between the open mold sections, at least two blow pipes entering the neck parts of the cavities between extruded sheets sideways and one above the other, and extending through said neck parts, each blow pipe having an external diameter substantially equal to the internal diameter of the neck formation of the respective article, the blow pipes thus serving to form in cooperation with the mold sections the neck formations, the blow pipes being also adapted to admit a fluid pressure medium, the mold sections being provided with cutting edges to pinch off at least two pairs of opposing segmens of the plastic sheets, the blow pipes being mounted to be withdrawn from the molded neck formations in a single direction, and to be reinserted between the sheets in opposite direction.

3. Apparatus for the simultaneous manufacture from plastics of at least four bottles and other hollow articles having a neck formation, comprising a sectional mold including two opposing sections, the mold having, when closed, two rows of separated cavities, each row having at least two cavities horizontally arranged one above the other and conforming in shape to the articles to be formed, the cavities of one row and the cavities of the other row having their neck parts directed outwardly in opposite directions, all cavities extending substantially in a single plane, nozzle means to spacedly extrude two sheets of the plastic material used to suspend vertically into the space between the open mold sections, two groups of at least two blow pipes each, the blow pipes of each group entering the neck parts of the cavities of one row sideways and one above the other, and extending through said neck parts, each blow pipe having an external diameter substantially equal to the internal diameter of the neck formation of the respective article, the blow pipes thus serving to form in cooperation with the mold sections the neck formations, the blow pipes being also adapted to admit a fluid pressure medium, the mold sections being provided with cutting edges to pinch off at least four pairs of opposing segments of the plastic sheets, the blow pipes of each group being mounted to be withdrawn from the respective molded neck formations in a single direction, and to be reinserted between the sheets in opposite direction.

4. In the process according to claim 1, extruding said sheets to have the blow pipes extend horizontally into the open mold space.

5. In the process according to claim 1, extruding said sheets to have the blow pipes lie in a plane parallel to the planes of the extruded sheets and extend in the same direction.

6. In the process according to claim 1, extruding said sheets to have the blow pipes lie in a plane parallel to the planes of the extruded sheets and extend in opposite directions into the open mold space.

7. In the process according to claim 1, extruding said sheets in form of a structure of substantially U-shaped cross section, the cross-sectional U lying flat, the legs of the U-shaped structure vertically into the open mold space, with the free ends of the legs pointing sideways, the leg-connecting web of the structure being at the other side.

8. In the process according to claim 1, spacedly extruding three sheets to suspend vertically into said open mold space in a substantially parallel relationship and to have the blow pipes lie freely between the center sheet and the outer sheets and extend into the open mold space.

9. In the process according to claim 7, arranging for the leg-connecting web of the U-shaped structure to lie inside the closed mold, thus avoiding that the web be severed by the closing mold sections.

References Cited in the file of this patent

UNITED STATES PATENTS

| Re. 23,564 | Hobson | Oct. 14, 1952 |
| 1,310,437 | Roberts | July 22, 1919 |

FOREIGN PATENTS

| 687,292 | Great Britain | Feb. 11, 1953 |
| 695,611 | Great Britain | Aug. 12, 1953 |
| 1,050,645 | France | Sept. 2, 1953 |
| 1,029,586 | France | Mar. 11, 1953 |